F. KRITZ.
TUBE WELDING MACHINE.
APPLICATION FILED SEPT. 10, 1917.
1,296,970.
Patented Mar. 11, 1919.
6 SHEETS—SHEET 1.
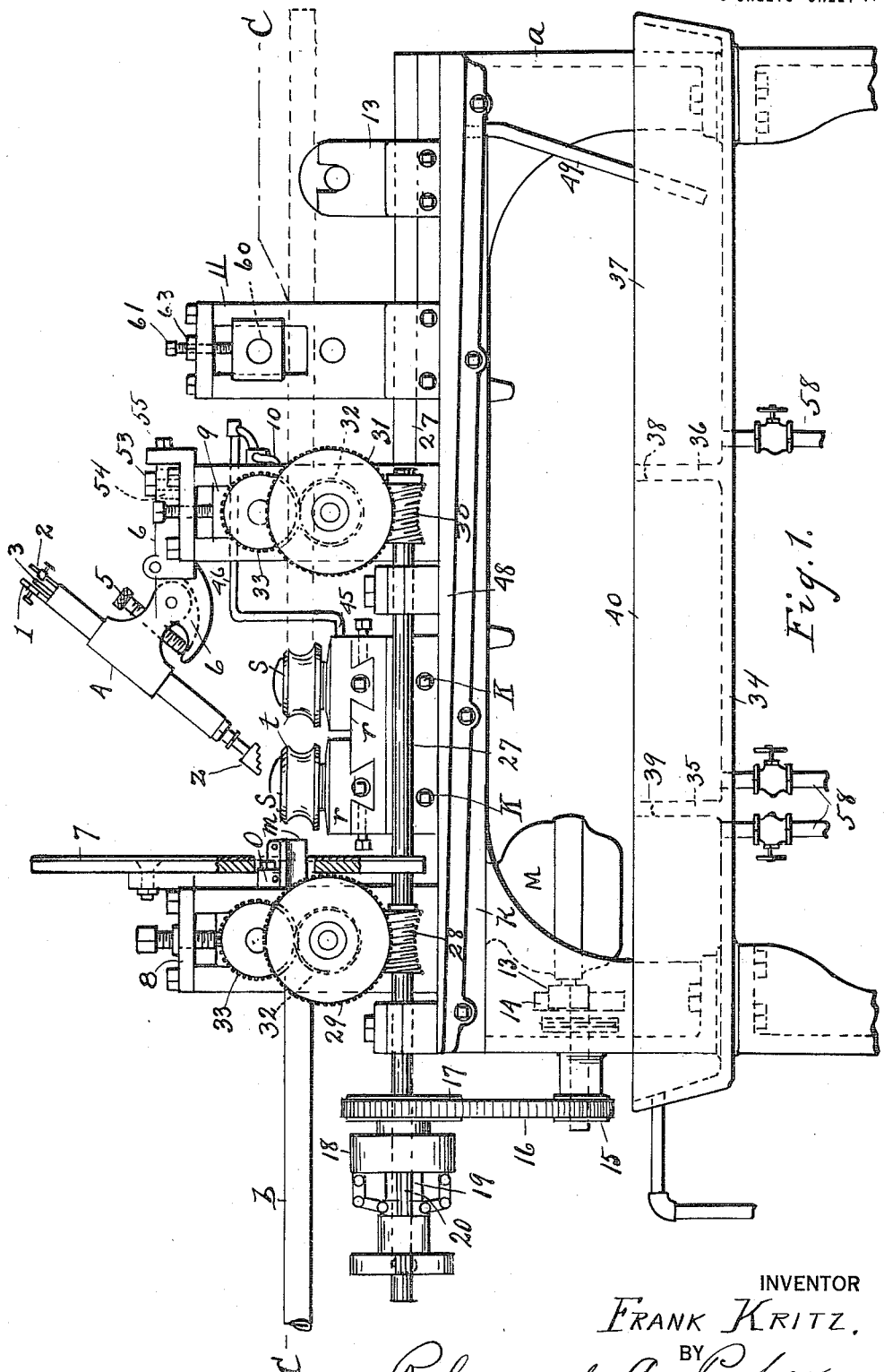
INVENTOR
FRANK KRITZ.
BY Raymond A. Parker
ATTORNEY

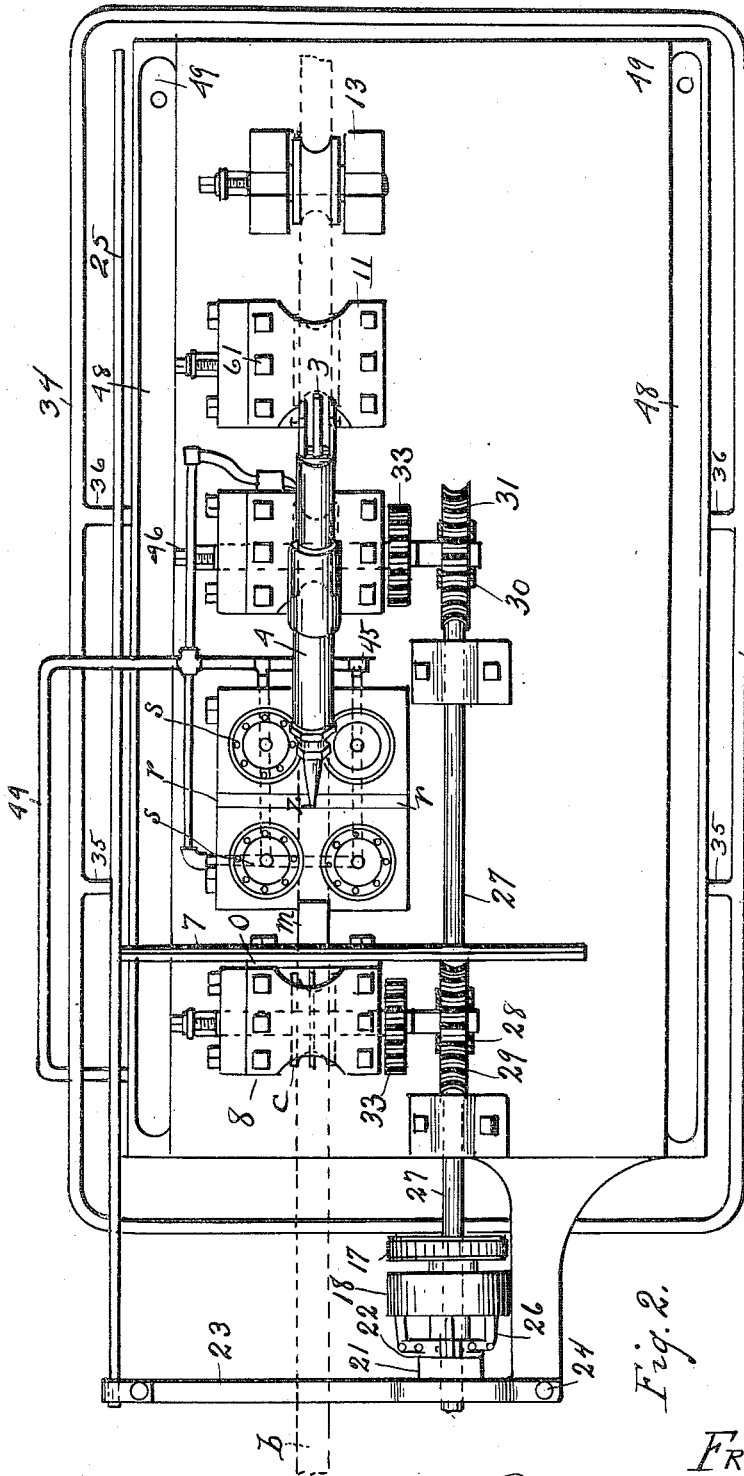

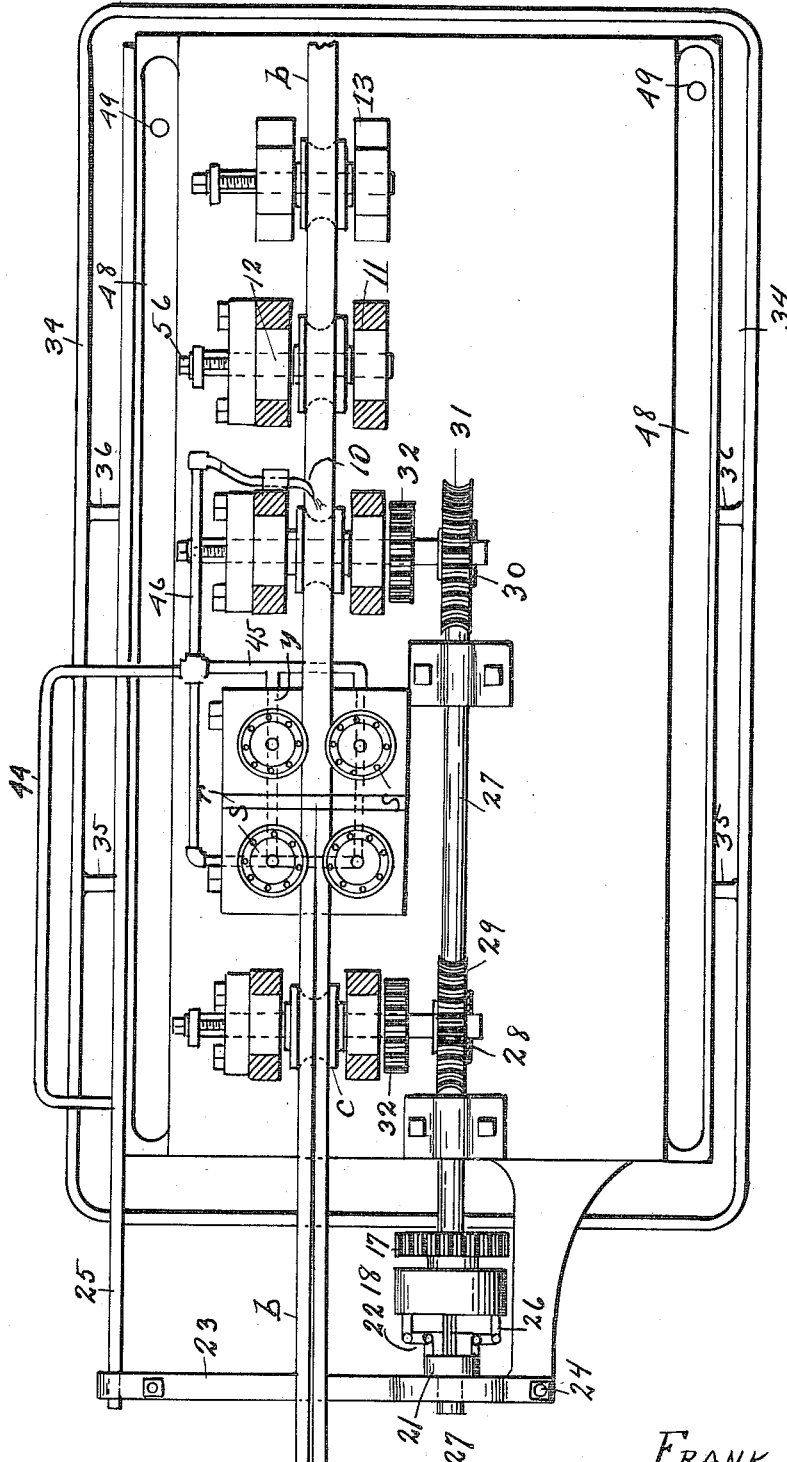

F. KRITZ.
TUBE WELDING MACHINE.
APPLICATION FILED SEPT. 10, 1917.
1,296,970.
Patented Mar. 11, 1919.
6 SHEETS—SHEET 4.
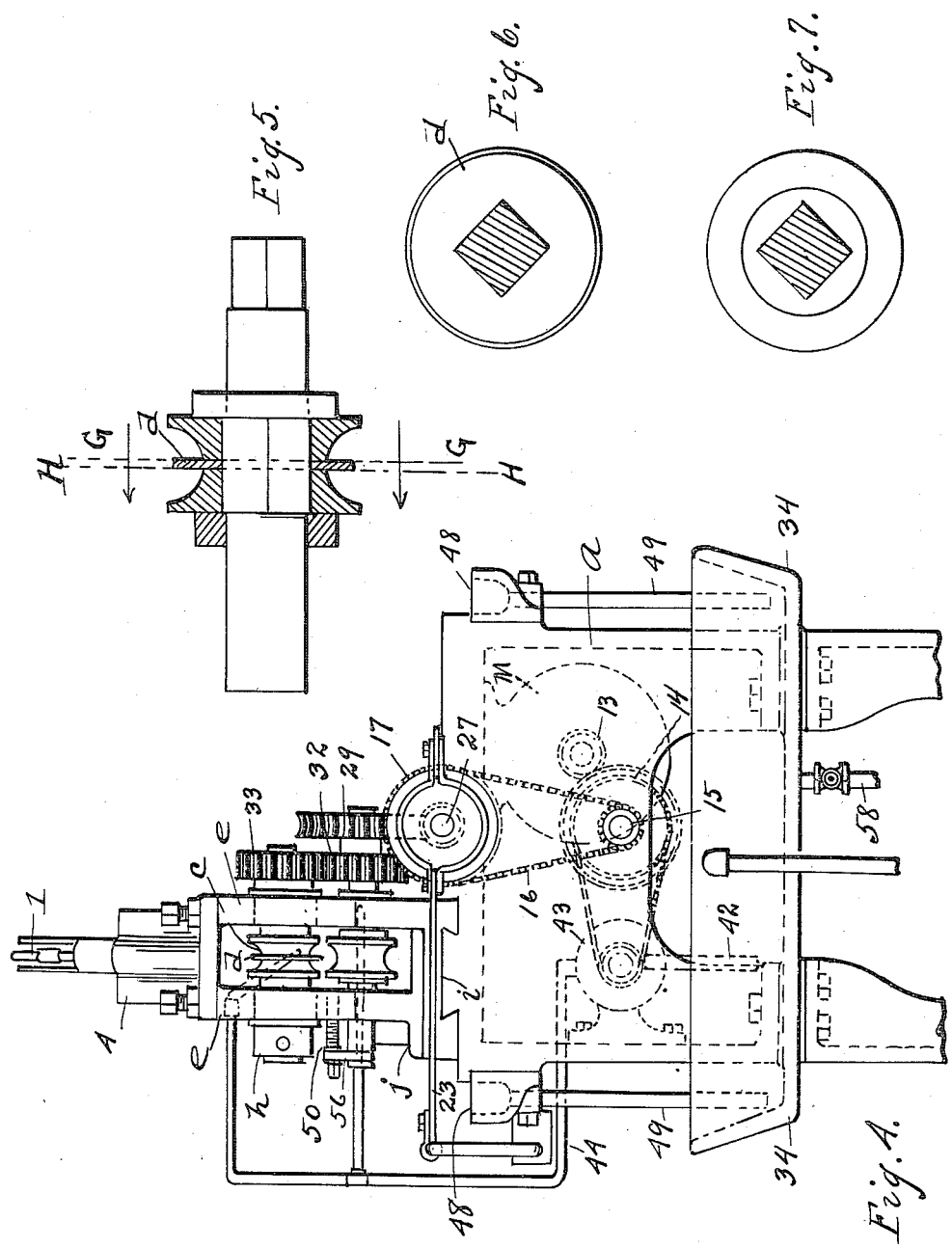
INVENTOR
FRANK KRITZ.
BY
Ralzemond A. Parker
ATTORNEY

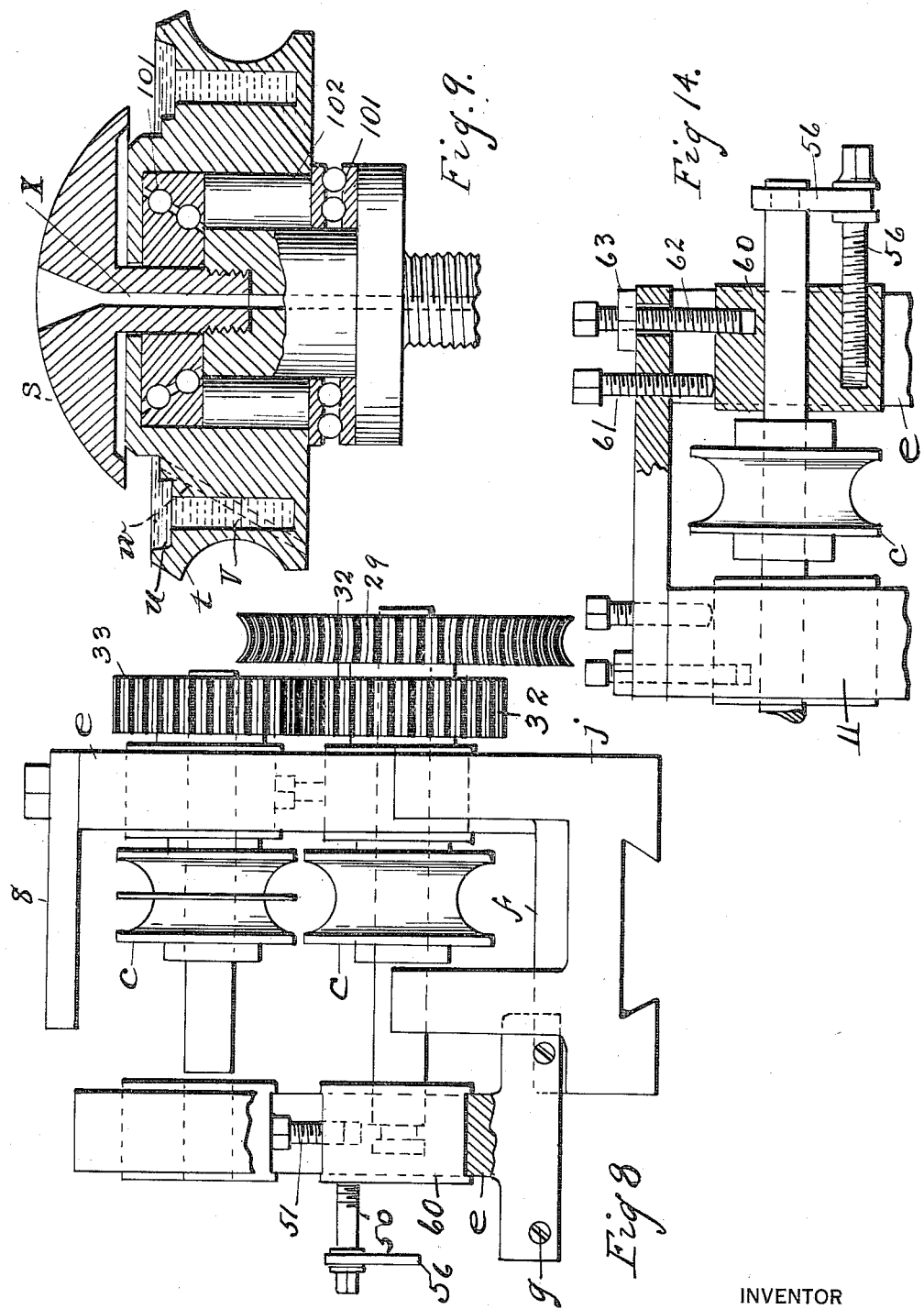

F. KRITZ.
TUBE WELDING MACHINE.
APPLICATION FILED SEPT. 10, 1917.
1,296,970.
Patented Mar. 11, 1919.
6 SHEETS—SHEET 6.
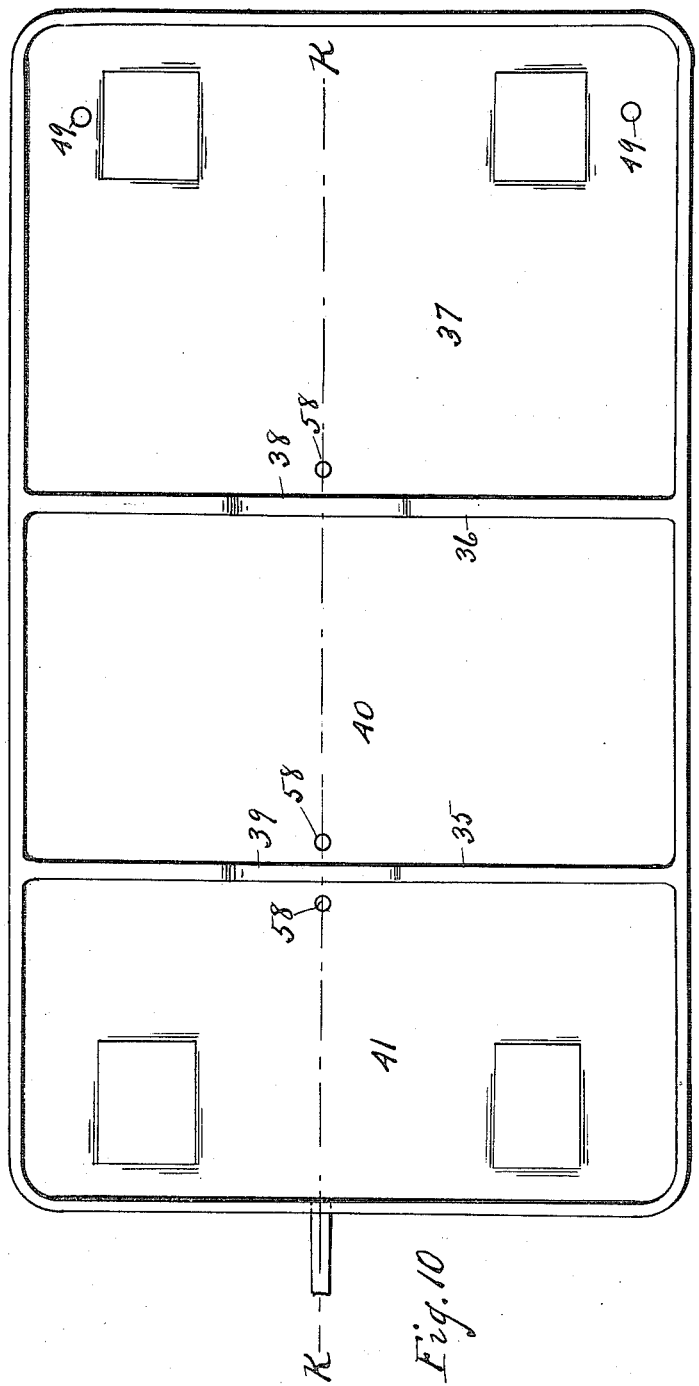
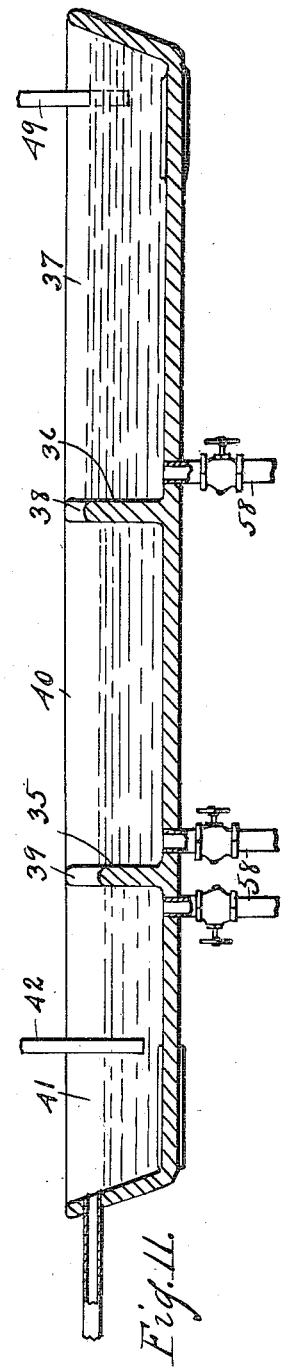
INVENTOR
FRANK KRITZ.
BY
Ralzemond A. Parker
ATTORNEY

UNITED STATES PATENT OFFICE.

FRANK KRITZ, OF DETROIT, MICHIGAN, ASSIGNOR TO MICHIGAN STEEL TUBE PRODUCTS CO., OF DETROIT, MICHIGAN, A CORPORATION OF MICHIGAN.

TUBE-WELDING MACHINE.

1,296,970. Specification of Letters Patent. Patented Mar. 11, 1919.

Application filed September 10, 1917. Serial No. 190,433.

*To all whom it may concern:*

Be it known that I, FRANK KRITZ, a citizen of the United States, residing at Detroit, county of Wayne, State of Michigan, have invented a certain new and useful Improvement in Tube-Welding Machines, and declare the following to be a full, clear, and exact description of the same, such as will enable others skilled in the art to which it pertains to make and use the same, reference being had to the accompanying drawings, which form a part of this specification.

This invention relates to machines for welding tubing and has for its object a machine which has the characteristics more fully described in the detailed specification following and a machine which is provided with an adequate cooling system to keep the parts in proper condition notwithstanding the intense heat of the welding torch.

This will more fully appear later.

In the drawings,—

Figure 1 is a side elevation of the machine.

Fig. 2 is a plan view.

Fig. 3 is a plan view taken on the section line C—C of Fig. 1.

Fig. 4 is an end elevation.

Fig. 5 is a detail of the shaft and roller that has a portion which runs in the split of the tube as it is fed into the machine.

Fig. 6 is a section on the line H—H of Fig. 5.

Fig. 7 is a section on the line G—G of Fig. 5.

Fig. 8 is an enlarged detail of the pair of rollers through which the tubing travels before it reaches the welding torch.

Fig. 9 is an enlarged detail of the rollers which serve to press the split tube together and are directly below the welding torch.

Fig. 10 is a plan view of the water pan under the welding machine.

Fig. 11 is a longitudinal section of the same.

Fig. 12 is an end elevation of the guiding mandrel.

Fig. 13 is a side elevation of the same.

Fig. 14 is a detail of the first idler roller set.

Referring to Fig. 1, the general elements in the machine will be understood. *a* designates the frame which carries the parts; *b* shows the tubing running into the machine or rather the split tube which has been formed by suitable rollers and dies, which are not shown for they are no part of this invention. These rolls and dies serve to form a strip of metal into a split tube. The split tube *b* which is clearly shown in Fig. 3 is then run into the feed and guiding rollers *c*. This pair of rollers is well shown in Figs. 4, 5, 6, 7 and 8. The upper roller is made up of two parts with an intervening disk *d*, forming an annular fin, adapted to run into the split of the tube so as to properly position the tube in guiding the same to the torch.

Fig. 8 shows how the movable journal bearing *e* for one side of the roller shafts can be drawn out on the dove-tail track *f* when the set screws *g* are loosened. When this journal bearing is removed after removing the thrust collar *h* (Fig. 4) the rollers may be slipped off the squared portions shown in Figs. 5, 6 and 7, and a new set of rollers to accommodate tubing of a different size or character may be inserted. The lower roller shaft may be adjusted lengthwise by means of the screw and strap 50. The relative spacing of the two shafts and rollers may be varied by the spacing screws 51 (Fig. 8). The entire machine has a dove-tail track *i* extending the length of the machine. Along this track the feed rollers *c* may be adjusted inasmuch as the rollers, journal bearing and driving gears are all mounted on the carriage *j*, which has a dove-tail recess complementary to the main dove-tail track of the machine frame. By loosening the set screw *k* (Fig. 1) this entire set may be adjusted longitudinally of the machine.

One of the important features in connection with this set for feeding and guiding the rolls is the mandrel *m*, an end view of which is shown in Fig. 12, and which appears also in Fig. 13 and in its relation to the other parts of the machine appears in Fig. 1. This mandrel comprises a fin portion *n* and a core *m*. The fin is pinned into the hanger *o* which is bolted to the two journals *e* for the feed and guide roller shafts. As the split tubing comes off from the feeding and guiding rolls it travels over this mandrel and the fin portion of the mandrel serves to keep the tubing in its right position for the application of the welding torch.

Refer to Fig. 1. On this main carriage are a pair of cross-carriages *r* running in dove-tails and each of which is provided with two upwardly extending shafts *s* upon which are rotatably journaled the rollers *t*. These rollers are detailed in Fig. 9. Each roller has at top and bottom, ball bearings 101 and at the sides roller bearings 102. This arrangement of bearings is very effective to prevent wear as no lubricant can be successfully used in these bearing on account of the heat. Each roller is provided with a depression *u* in its top surface and this depression communicates with a plurality of pockets *v* and an outlet hole *w*. The shafts *s* have each a center bore *x* which communicates by a radial bore with a water passage *y* through the cross-carriage and which is supplied with water in a manner hereinafter specified. The water consequently goes through the passage *y* up to the bore *x* and bubbles over the top of the shaft into the depression *u*, some of it going into the pockets *v* and some of it through the hole *w*, where it gradually runs through and down on to the bed of the machine, where suitable troughs are provided to carry it away. The purpose of these pockets and hole is cooling. These rollers are directly under the welding torch shown in Fig. 1 and designated *z*.

The welding torch (Fig. 1) is an acetylene welding torch provided with acetylene gas and oxygen through the tubes 1 and 2 and with cooling water through the tube 3, but inasmuch as this is no part of my invention and a separate article of manufacture that can be purchased upon the market, I will not further describe this. However, the manner in which I mount this welding torch for adjustment I believe to be novel. A sleeve 4 encompasses the welding torch and is provided with a tapped hole for a screw 5 and has also a lug with a pivot hole by which the same is pivotally connected with the bracket 6. This bracket is secured to the top of the roller set 9 cap by a screw 53 engaging through a slot 54. Hence the bracket may be slid along the cap within certain limits and its adjustment fixed by the screws 53 and 55. This bracket is provided, as shown in the dotted lines of Fig. 1, with a segmental race. Consequently by adjusting the screw 5 farther out of its tapped hole, the point of the screw will rest farther in on the segmental race and consequently the torch will be tipped at an angle more nearly vertical. Obviously this affords a means of adjusting within given limits the angular disposition of the torch, whose end therefore travels in the arc of a circle.

The individual rollers or pairs of rollers *t* are close enough together so as to press together the split tube as it leaves the mandrel so that the edges abut. This, of course, is a necessary position and the butt welding is effected by the heat generated in the combustion maintained by the torch.

In order to shield the feed and guide rollers and people who may be passing at that end of the machine, an asbestos shield 7 is bolted to the cap 8 of the first roller set.

To guide and keep the recently joined edges of the tube together as it leaves the torch, rollers are provided, a set located in a carriage and cross-carriage of substantially the form described and shown in respect to the feed and guide rollers. This whole set of driven rollers (designated 9 and called the second roller set) needs no further description. Inasmuch as the tube is still very hot when it passes into these rollers, provision is made to cool the same by letting the water run out of the nozzle 10 onto the tube and the rollers.

The idler roller set is designated 11 and comprises one roller mounted on a shaft 12 adjustable crosswise of the carriage by means of a strap and screw 56 (Fig. 14), precisely as described in reference to the first roller set (strap and screw 50). The journal blocks 60 are adjustable vertically by the set screws 61 (Fig. 14) and the threaded stud 62 and jam nuts 63. The final roller set is an idler roller set with a single roller which supports the tubing from beneath. This also has a shaft adjustable lengthwise in the same fashion. The two idler sets, therefore, comprise together an upper and a lower roller, one of which prevents the tubing from tipping upward and the other supports the weight of the tubing until it leaves the machine as the finished product.

Driving the machine (Figs. 1 and 4) is effected through the electric motor M provided with a spur gear 13 meshing with a larger gear 14 and the shaft has at its end a small sprocket wheel 15 over which runs the chain 16 that drives the larger sprocket wheel 17 which is in driving relation with the clutch part 18 (Fig. 1). The other clutch part is splined to the shaft 19 by the key 20. A clutch collar 21 (Fig. 2) is provided with a clutch race 22. The clutch collar 21 is carried on the lever 23 which is pivoted to the machine at 24. 25 represents a rod attached to the end of the clutch lever. Consequently when the rod 25 is pulled to the right in Fig. 2 the clutch collar is also forced to the right or inward and through the elbows 26 forces the two clutch parts together and consequently connects up the driving gear with the driven shaft 27 which is provided with a worm 28 that drives the spiral gear 29 of the first or feed and guiding roll set and with a worm 30 that engages the spiral wheel 31 that drives the roll set 9 or the second roll set. Each of these roll sets is provided with a pair of intermeshing spur gears 32 and 33 for the purpose of driving the two individual rollers of each set in opposite directions. From this description of the gearing it is obvious that the driving effort is gradually reduced in speed and increases in leverage.

Secured to the leg of the machine (Fig. 1), which legs are made in two parts, is the water pan 34 divided by two partitions 35 and 36 into three basins. The overflow from the basin 37 is through the opening 38 which is slightly higher than the opening 39 in the next basin 40 which leads to the final basin 41. The water is taken from the last basin 41 through the pipes 42 by the pump 43 (Fig. 4) and thence it is forced through the main 44 (Fig. 3) to the pipe 45 leading to the passage-ways through the rolls detailed in Fig. 9. The pipe 46 leads to the nozzle 10 that discharges on the tubing and the second set of rolls 9. The water drops on the bed of the machine and flows off the sides into the gutters 48 which are bolted to the side of the machine (Fig. 1). These gutters slope to the right and are provided with discharge pipes 49 which empty into the basin 37 of the water pan 34. The consequence is that the water is used over and over again and expense avoided by abnormal use of water. Drain pipes and cocks 58 for draining out the sediment in each basin are provided.

The operation has already been to some extent described. The strip of metal is formed up into a split tube by forming dies and rollers not shown in the drawings but which are well known in the prior art. The tubing passes from these forming rolls or from stacks of tubing where the product of the forming rolls is piled up, to the tube welding machine. It is given its proper position for bringing the edges to be welded directly under the welding torch by reason of the fin on the first set of rollers and the fin on the mandrel. The tubing then passes between the horizontal rollers $t$ where the meeting edges are caused to abut. Here the flame from the welding torch strikes the abutting edges, melting the metal and causing the same to weld together. These rollers $t$ are water cooled as already pointed out. The tubing then passes through the second set of rollers which are further water cooled as well as the tubing, and the tubing passes from here under the roller 11 and above the roller 13, and out of the machine.

What I claim is:

1. In a tube welding machine, the combination of guiding means in the form of a mandrel supported by a fin separating the edges of a completely formed split tube and holding the tubing from twisting as it is guided to the heating zone, means for causing the separated edges to meet, and means for heating the meeting edges to weld the same.

2. In a tube welding machine, the combination of a pair of rollers, one of which is provided with an annular fin to engage between the separated edges of the partially formed tube, a mandrel following said rollers and having a fin by which it is supported and which engages between the separated edges of the completely formed split tubing, means for pressing the separated edges of the tubing together, and means for heating the pressed together edges for welding the same.

3. In a tube welding machine, the combination of means for pressing the edges of a completely formed split tube together, a torch for welding the meeting edges of said tube, and a mandrel supported in juxtaposition with said torch, comprising a cylindrical member for fitting inside of the tubing and a relatively flat thin fin for supporting the cylindrical portion and for running between the meeting edges, said fin having relatively great length in the direction of the axis of the tubing.

4. In a tube welding machine, a plurality of rollers, shafts for journaling the same provided with water passage-ways allowing water to bubble out at one end of the shaft, means for supplying water under pressure to the lower end of the shaft, water holes in said rollers, and a welding torch operating in adjacency to the rollers.

5. In a tube welding machine, a plurality of rollers for pressing together the partially formed edges of tubing, said rollers being provided with pockets and holes, the latter reaching clear through the rollers, shafts journaling the rollers provided with water passage-ways, means for supplying water under pressure to the lower end of the passage-ways in the shafts, and a welding torch operating adjacent said rollers.

6. In a tube welding machine, a mandrel provided with a fin running along substantially a large portion of the length of the mandrel and by which the mandrel is supported and which serves to keep apart the edges of split tubing fed over the mandrel, means for pressing the edges together, and a welding torch forming a heating zone immediately beyond the end of the mandrel.

7. In a tube welding machine, the combination of a bracket provided with a segmental race, a welding torch, a member fastened to the torch, and a set screw threaded into such member and provided with a point that rests in said segmental race.

8. In a tube welding machine, a plurality of rollers, shafts for journaling the same provided with water passage-ways allowing water to bubble out at one end of the shaft, means for supplying water under pressure to the lower end of the shaft, and a welding torch operating in adjacency to said rollers.

9. In a tube welding machine, the combination of rollers, a welding torch, means for furnishing water to the rollers, a pan under the rollers into which the water may be gathered, and a pump for taking the water from the pan and returning it to the means for supplying the water to the rollers.

10. In a tube welding machine, a machine bed including the legs, a plurality of rollers, a welding torch operating in conjunction with said rollers, means for supplying water to the rollers, a pan carried under the bed of the machine and divided into sedimentation basins, and a pump for taking the water from the last basin and returning it to the means for supplying the water to the rollers.

11. In a tube-welding machine, a welding torch, means for pressing the edges of split tubing together, and a guiding mandrel comprising a cylindrical body formed to fit within the completed split tube to hold it to the desired diameter with the edges of the tube in substantial registry, and provided with a supporting fin for centering the tubing.

12. In a tube welding machine, a welding torch, means for pressing the edges of split tubing together to weld the same, and a guiding mandrel comprising a fin engaging between the edges of the split tube to prevent twisting of the tube and a body member adapted to underlie and contact the inside of the completed split tubing for such a distance as to keep the edges of the tubing in substantially accurate registry.

13. In a tube-welding machine, the combination of a welding torch, means for pressing split tubing together and a guiding mandrel comprising a fin for contacting the edges of the split tubing to center the same with respect to the torch, and a cylindrical body adapted to fit into the split tube adjacent its edges to secure registry of the edges.

In testimony whereof, I sign this specification.

FRANK KRITZ.